(12) United States Patent
Ante et al.

(10) Patent No.: US 7,364,020 B2
(45) Date of Patent: Apr. 29, 2008

(54) MEASURING DEVICE FOR AN ELECTROMECHANICAL BRAKE

(75) Inventors: Johannes Ante, Regensburg (DE); Stephan Heinrich, Regensburg (DE); Andreas Ott, Steinsberg (DE)

(73) Assignee: Siemens Aktiengesellschaft, München (DE)

( * ) Notice: Subject to any disclaimer, the term of this patent is extended or adjusted under 35 U.S.C. 154(b) by 97 days.

(21) Appl. No.: 10/968,840

(22) Filed: Oct. 19, 2004

(65) Prior Publication Data

US 2005/0140205 A1 Jun. 30, 2005

(30) Foreign Application Priority Data

Oct. 27, 2003 (DE) ............................. 103 50 085

(51) Int. Cl.
*F16D 66/00* (2006.01)

(52) U.S. Cl. .................. 188/1.11 E; 188/73.2; 188/156

(58) Field of Classification Search ........... 188/1.11 E, 188/71.1, 71.8, 73.2, 156–158, 206 R
See application file for complete search history.

(56) References Cited

U.S. PATENT DOCUMENTS

| 2,986,345 | A | * | 5/1961 | Gauldie | ...................... 241/148 |
| 3,124,959 | A | * | 3/1964 | Pall et al. | ...................... 73/716 |
| 4,784,244 | A | * | 11/1988 | Carre et al. | .................. 188/156 |
| 5,490,427 | A | * | 2/1996 | Yee et al. | ...................... 73/767 |
| 5,883,337 | A | * | 3/1999 | Dolan et al. | ................. 177/163 |
| 6,412,610 | B1 | * | 7/2002 | Drennen et al. | ............. 188/156 |
| 6,572,710 | B2 | * | 6/2003 | Middendorf et al. | ........... 134/6 |
| 2005/0247528 | A1 | * | 11/2005 | Schack et al. | ............. 188/72.8 |

FOREIGN PATENT DOCUMENTS

| DE | 10151561 | | 7/2002 |
| JP | 60143173 | A * | 7/1985 |
| WO | 0108227 | | 2/2001 |
| WO | WO-02096733 | A1 * | 12/2002 |

* cited by examiner

*Primary Examiner*—Melody M. Burch
(74) *Attorney, Agent, or Firm*—Martin A. Farber

(57) ABSTRACT

A force sensor for an electromechanical brake has a closed ring having a C-shaped profile that is open inwardly. Force is introduced along the inner circumference of the ring.

14 Claims, 4 Drawing Sheets

MEASURING DEVICE FOR AN ELECTROMECHANICAL BRAKE

FIELD AND BACKGROUND OF THE INVENTION

The present invention relates to a measuring device for an electro mechanical brake, and to an electro mechanical brake for a motor vehicle.

In the case of electro mechanical brakes in the field of motor vehicles, the braking force is produced by electric motor and transmitted mechanically to the brake shoes. In the case of disc brakes actuated by electric motor, the force sensor is arranged in the force flux and serves the purpose of accurately measuring the force exerted on the brake disc, in order to be able to drive the motor appropriately.

DE 101 51 561 A1 dispenses a force sensor for an electro mechanical brake that is designed as a ring and provided with three projections projecting in the axial direction. Support regions extending in the radial direction of the ring are formed centrally between the projections. The force is introduced via the axial projections, the reaction forces being introduced via the support regions. Pairs of strain gauges are arranged between axial projections and support regions on the ring element. The force sensor is deformed in an undulating fashion when the braking force is applied to it. The deformation is converted into the introduced braking force by the strain gauges and by an evaluation device.

SUMMARY OF THE INVENTION

It is the object of the invention to create a measuring device for an electro mechanical brake that supplies signals of adequate magnitude as far as possible in conjunction with simple manufacture. The object is achieved according to the invention by means of a measuring device having the features of claim 1, and by means of an electro mechanical brake. Advantageous refinements are respectively the subject matter of the sub claims.

The measuring device according to the invention has an annular force sensor and an associated strain gauge. The force sensor has the shape of a closed circular ring. The ring has in cross section a C-shaped profile with two parallel limbs arranged spaced apart from one another. In contrast with the annular force sensor already known from the above prior art, the force sensor according to the invention is designed as a ring with a C-shaped cross section and not a rectangular one. Force is introduced into the limbs in the case of the force sensor according to the invention, as a result of which the ring is deformed and the spacing between the ends of the limbs is reduced. The strain gauge is arranged at least on one of the limbs and detects the strain produced by the bending of the limb. The strain of the limb can then be converted into the magnitude of the introduced force using methods known per se. The limbs preferably point into the center of the ring.

The use of a C profile for force measurement results in a substantially higher accuracy of the signals and enables very reliable measurement of the forces occurring in the case of an electromechanical brake.

In a preferred refinement, the transition from the base of the C profile to the limbs is rounded. A radius of curvature of approximately 1.5 mm is preferably used in this case. The ring has regions for introducing a force acting between an actuating element for a brake shoe and a caliper of the brake, the regions expediently being situated at the free end of the limbs on the outside. The regions for introducing the force preferably respectively run annularly along the free end of the limbs.

A strain gauge is arranged next to the force introduction region on the outside of the limb in order to measure the force introduced. In a preferred refinement, the strain gauge is arranged on the outside of a limb which points toward the caliper.

The strain gauge is preferably arranged on one of the limbs along the circumference. The signals of the strain gauges distributed over the circumference are averaged in order to evaluate them.

The strain gauge has measurement strain resistors that advantageously extend in the radial direction of the ring. The signals of the measurement strain resistors are led out by connecting individual resistors in parallel and/or series, or by means of resistance bridges.

In a particularly preferred refinement, silicon strain gauges are provided as strain gauge. Such silicon strain gauges are known, for example, from WO 01/08227. These are semiconductor strainometers that have a resistance substrate layer and a layer, supported by the latter, made from electrically conducting silicon. A particular advantage of the silicon strain gauges is that the latter exhibit a particularly small thickness.

The force sensor preferably consists of a precipitation hardenable steel when use is made of silicon strain gauges. Steel of type 17-4PH or Inconel 718 is preferably used here. The silicon strain gauges are preferably connected to the force sensor by means of lead borate glass solder.

Overall the use of a precipitation hardenable steel (PH steel) lends the force sensor a substantially greater strength. By comparison with the steels that are suitable for the known application of thick layers for the strain measuring elements, a PH steel has more than twice the strength and tensile yield strength. All PH steels contain nickel in order to permit precipitation hardening. The nickel content lowers the hardening temperature. During cooling, each steel changes volume upon exceeding the hardening temperature; if said change in volume is below the hardening temperature of a processed thick resistance layer, the layer peels off. Consequently, despite their strength and high tensile yield strength, PH steels cannot be used with processed thick resistance layers.

The silicon strain gauges as described in WO 01/08227 are bonded to the measuring ring by means of lead borate glass solder.

The object according to the invention is likewise achieved by means of an electromechanical brake having the measuring device described above, force being introduced into the ring via projections in the caliper. In the case of the associated second region for introducing force, as well, force is preferably introduced into the ring via projections on an actuating element for the brake shoes. The projections for introducing force into the measuring device preferably have a spherical bearing surface. As a result, a circular force introduction region is defined when force is introduced in an annularly running fashion.

BRIEF DESCRIPTION OF THE DRAWINGS

The measuring device according to the invention and the electromechanical brake are explained below in more detail with the aid of an exemplary embodiment.

In the drawing.

DETAILED DESCRIPTION OF THE PREFERRED EMBODIMENT

Figure 1:
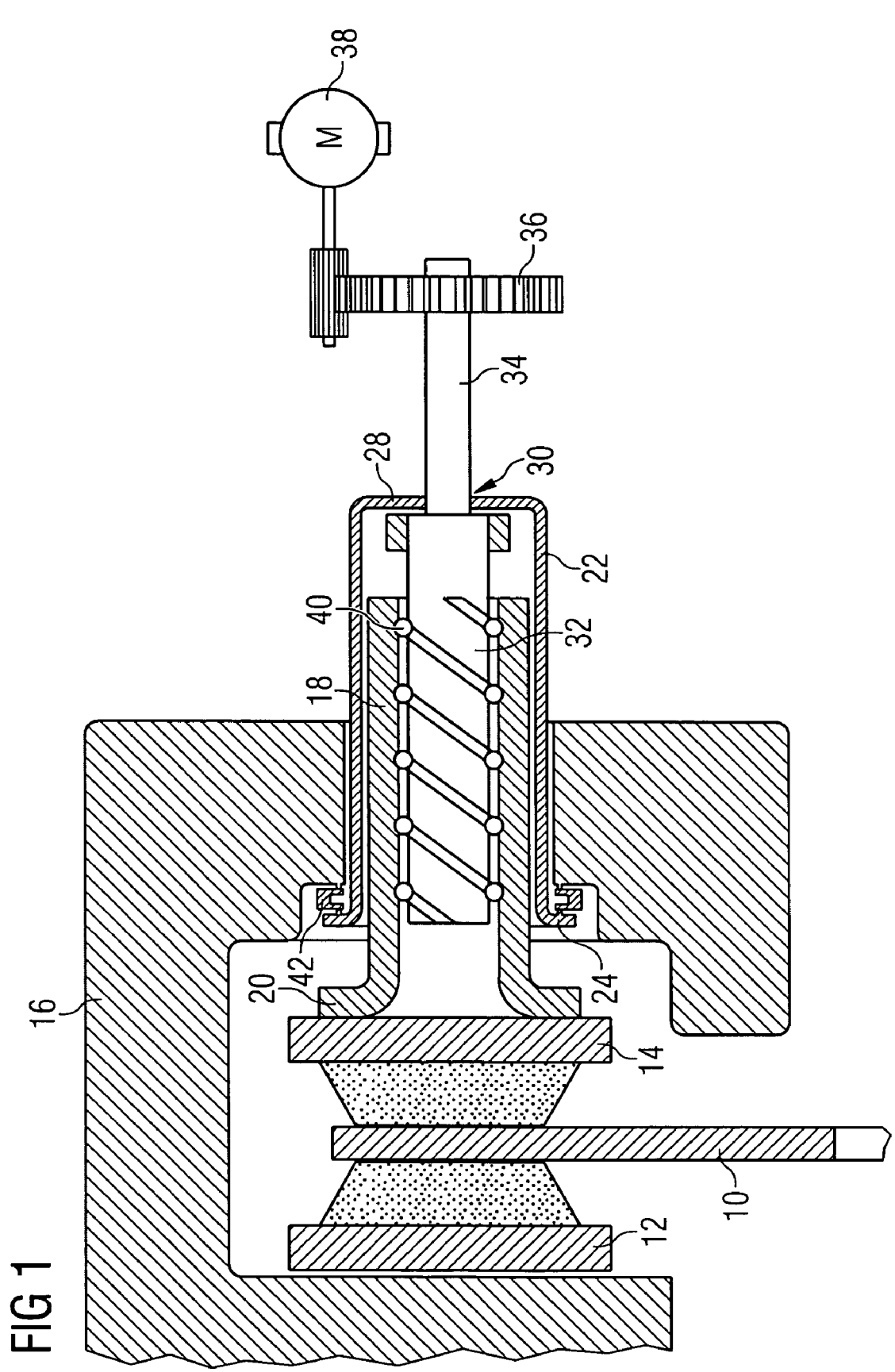
FIG. 1 shows the schematic diagram of an electromechanical brake.

FIG. 1 is a diagrammatic view of an electromechanical brake for a brake disc 10. Two brake shoes 12 and 14 are arranged at the outer rim of the brake disc 10 on opposite sides thereof. The brake shoe 12 is mounted on a caliper 16. The brake shoe 14 is supported on a pressure piston 18. The pressure piston 18 has an inner thread, and is widened in the region of its connection to the brake shoe 14 to form a circumferential flange 20. The pressure piston 18 is supported displaceably in a sleeve 22. The sleeve 22 is guided through an opening in the caliper 16. At its end pointing toward the brake shoe 14, the sleeve 22 is provided with an outwardly projecting flange 24. The flange 24 has on its side pointing away from the brake shoe a projection 26 whose free end is spherically rounded.

At its end pointing away from the brake disc 10, the sleeve 22 has a base 28 that is provided with a central bore 30. Running in an axial direction in the pressure piston 18, which is arranged in the sleeve 22, is a spindle 32 whose shaft 34 projects from the central bore 30. The end of the shaft 34 pointing away from the caliper is provided with a pinion 36. The pinion 36 is rotated by a suitably designed gear (not illustrated) that is driven by a schematically illustrated motor 38. The spindle 32 is supported by balls 40 in the pressure piston 18.

An annular force sensor 42 is arranged between the sleeve 22 and caliper 16.

During operation, the motor exerts a torque on the pinion 36, as a result of which the spindle 32 exerts an axial force on the pressure piston 18. The brake shoes 12 and 14 are thereby pressed against the brake disc 10 with the applied force. The reaction force of the pressure piston 18 is transmitted by the bearing of the spindle 32 in the sleeve 22 onto the flange 24 where this force acts on the force sensor 42. The force sensor 42 experiences a reaction force of the caliper 16.

Figure 2:
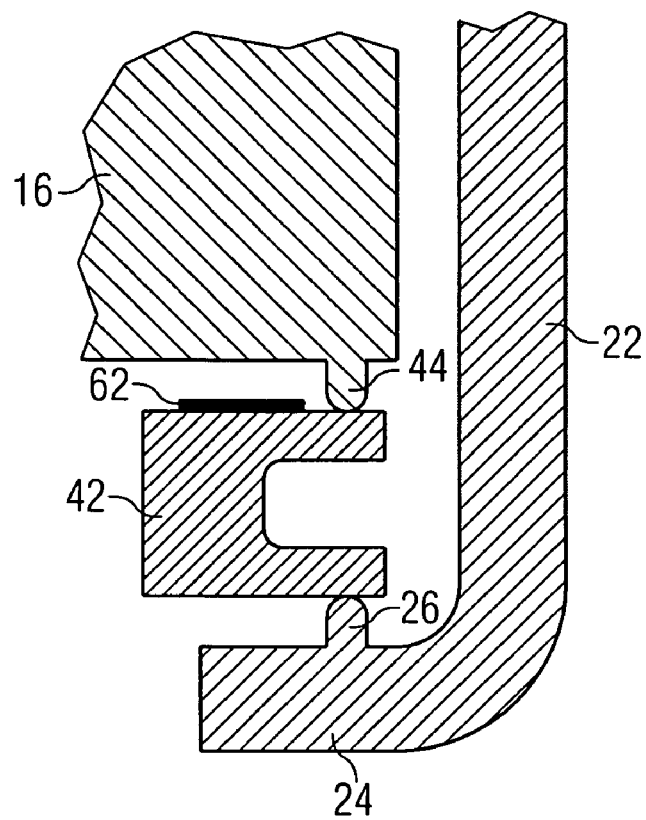
FIG. 2 shows a view of a detail from FIG. 1.

As illustrated in FIG. 2, the caliper 16 also has a projection 44 whose end is of spherical design. As may be seen from FIG. 2, force is introduced into the force sensor 42 via the projections 26 and 44 in an annular fashion.

Figure 3:
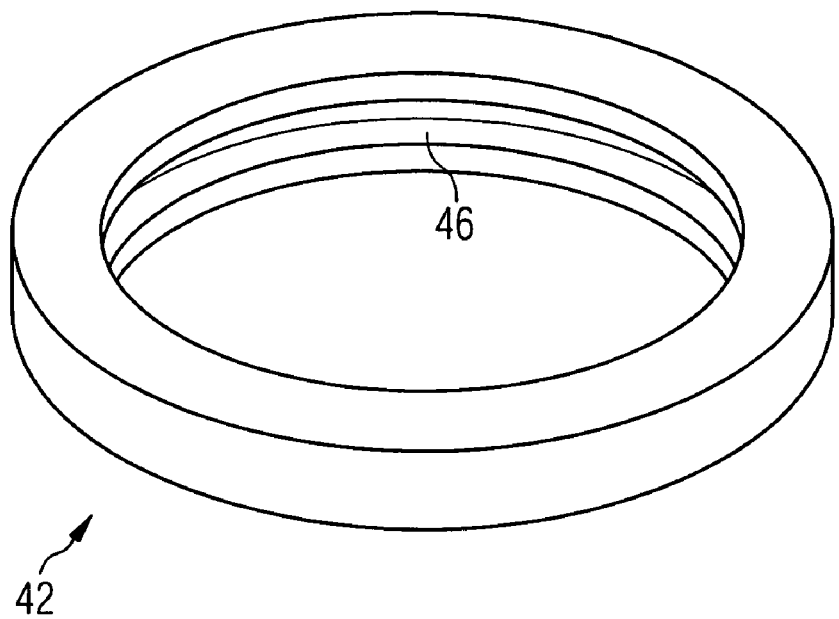
FIG. 3 shows a perspective view of the force sensor according to the invention.
Figure 4:
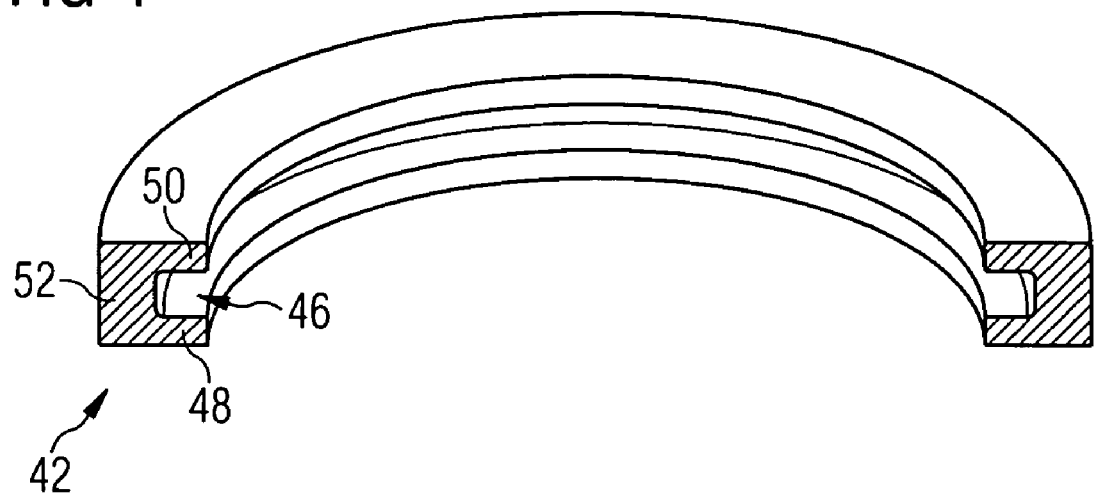
FIG. 4 shows a perspective view of the sectioned force sensor.

FIGS. 3 and 4 show the force sensor designed as a ring. On its inside, the ring has a circumferential groove 46 that defines two limbs 48 and 50. As illustrated in FIG. 4, the depth of the groove 46 is preferably selected such that the base 52 of the ring has a greater thickness than the two limbs 48 and 50.

Figure 5:
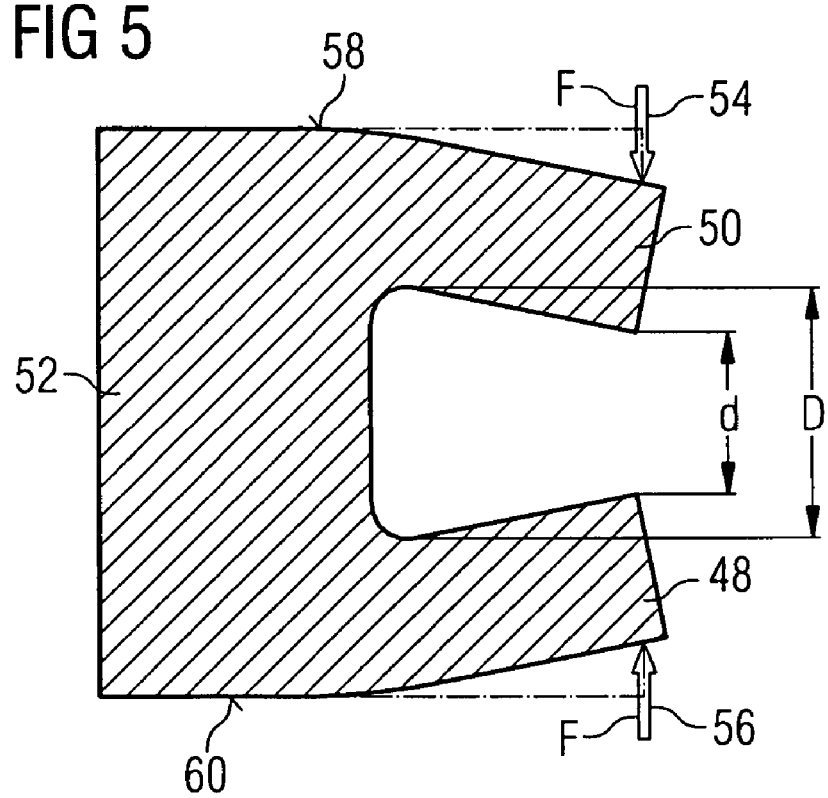
FIG. 5 shows a deformation occurring in the force sensor.
Figure 6:
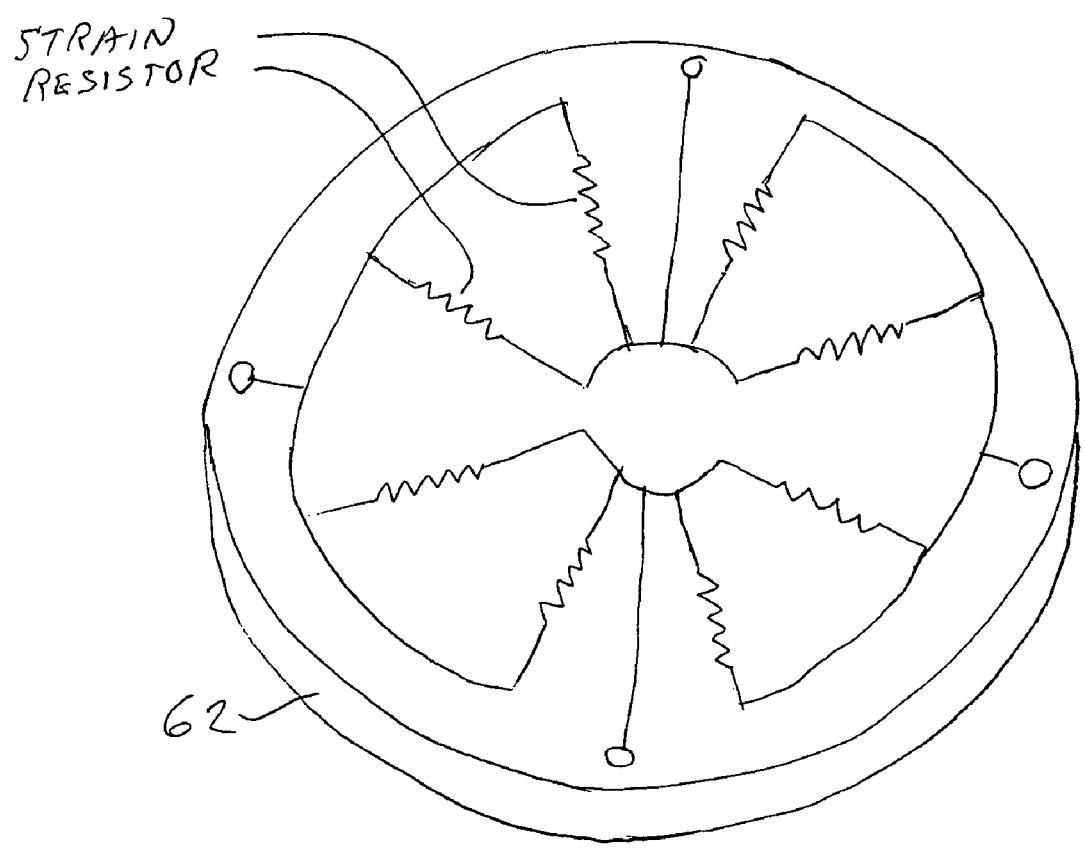
FIG. 6 shows schematic diagram of strain resistors in the force sensor, the resistors being arranged radially.

FIG. 5 shows a diagram of the mode of operation of the force sensor 42. The couple 54 and 56 presses the limbs 48 and 50 together such that their spacing is reduced from magnitude D to magnitude d. The bending of the limbs causes on their outer sides 58 and 60 a strain that is measured by a strain measuring system 62 (compare FIG. 2). The magnitude of the introduced forces 54, 56 can be calculated from the measured strain.

We claim:

1. A measuring device for an electromechanical brake (EMB) in a motor vehicle, wherein the brake comprises a brake shoe and a caliper, and an actuating element for introducing a force between the brake shoe and the caliper, the measuring device comprising:

a force sensor (42) in the form of a closed ring which has in cross section a C-shaped profile with two parallel limbs (48, 50) arranged spaced apart from one another;

regions for introducing said force of the actuator into the ring, the regions being between the actuating element (18) for the brake shoe (14) and the caliper (16) of the brake, wherein the regions are situated at the free end of the limbs (48, 50) on the outside thereof; and a strain gauge (62) that is arranged on the outside of the ring next to one of the force-introduction regions of the limbs (48, 50), wherein the strain gauge (62) is arranged on one of the limbs along the circumference of the force sensor.

2. The measuring device as claimed in claim 1, wherein the limbs (48, 50) point toward the center of the ring.

3. The measuring device as claimed in claim 1, wherein the transition from the base (52) of the C profile to the limbs (48, 50) is rounded, with a radius of curvature of approximately 1.5 mm.

4. The measuring device as claimed in claim 1, wherein the regions for introducing the force are disposed annularly along the free ends of the limbs (48, 50).

5. The measuring device as claimed in claim 1, wherein the strain gauge is disposed on the outside of said limb, which points toward the caliper.

6. The measuring device as claimed in claim 1, wherein different signals of the strain gauge are averaged.

7. The measuring device as claimed in claim 1, wherein the strain gauge (62) has strain resistors that are arranged in the radial direction of the ring.

8. The measuring device as claimed in claim 1, wherein the strain gauge (62) comprises silicon strain gauges.

9. The measuring device as claimed in claim 8, wherein the force sensor is produced from a precipitation hardenable steel.

10. The measuring device as claimed in claim 9, wherein the precipitation hardenable steel is of type 17-4PH or INCONEL 718.

11. The measuring device as claimed in claim 8, wherein the silicon strain gauges are connected to the force sensor by means of lead borate glass solder.

12. The measuring device as claimed in claim 11, wherein there is provided on the caliper (16) a circumferential projection (44) via which force is introduced into the ring.

13. The measuring device as claimed in claim 12, wherein said brake shoe is a first brake shoe, said measuring device further comprises a second brake shoe, and there is provided on the actuating element (22, 24) for one of the brake shoes (12, 14) a circumferential projection (26) via which force is introduced into the ring.

14. The measuring device as claimed in claim 12, wherein the projection (44) for introducing force is designed with a spherical bearing surface.

* * * * *